United States Patent
Ashokkumar et al.

(10) Patent No.: US 10,684,791 B2
(45) Date of Patent: Jun. 16, 2020

(54) SYSTEM AND METHOD FOR ENVIRONMENT AWARE BACKUP AND RESTORATION

(71) Applicant: EMC IP Holding Company LLC, Hopkinton, MA (US)

(72) Inventors: Pravin Kumar Ashokkumar, Bangalore (IN); Aaditya Rakesh Bansal, Bangalore (IN); Sudha Vamanraj Hebsur, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 16/143,317

(22) Filed: Sep. 26, 2018

(65) Prior Publication Data

US 2020/0097177 A1    Mar. 26, 2020

(51) Int. Cl.
*G06F 3/06* (2006.01)
*G06F 9/455* (2018.01)

(52) U.S. Cl.
CPC ............ *G06F 3/065* (2013.01); *G06F 3/0619* (2013.01); *G06F 3/0664* (2013.01); *G06F 3/0673* (2013.01); *G06F 9/45533* (2013.01); G06F 2009/4557 (2013.01)

(58) Field of Classification Search
CPC .......... G06F 12/00; G06F 13/00; G06F 3/065; G06F 3/0619; G06F 3/0673

USPC .......................................... 711/154, 161, 162
See application file for complete search history.

(56) References Cited

U.S. PATENT DOCUMENTS

| 8,200,923 B1 * | 6/2012 | Healey ................ G06F 11/1453 711/162 |
| 9,934,099 B1 * | 4/2018 | Sharma ............... G06F 11/1458 |
| 2014/0195718 A1 * | 7/2014 | Abraham .................. G06F 9/00 711/103 |

* cited by examiner

*Primary Examiner* — Tuan V Thai
(74) *Attorney, Agent, or Firm* — Chamberlain, Hrdlicka, White, Williams & Aughtry

(57) ABSTRACT

A remote agent for performing a backup of a virtual machine includes a persistent storage that stores backup policies and a backup manager that obtains a backup generation request for the virtual machine and, in response to the backup generation request, performs a component validation analysis of a production host that hosts the virtual machine to identify a backup state of the production host; makes a first determination, based on the backup state of the production host, that the production host is in a backup-enabled state; and, in response to the first determination, generates a backup of the virtual machine, using the backup policies, for storage in a backup storage; and validates that the backup of the virtual machine is stored in the backup storage based on a reduced size representation of the backup and a reduced size representation of a copy of the backup in the backup storage.

17 Claims, 16 Drawing Sheets

US 10,684,791 B2

SYSTEM AND METHOD FOR ENVIRONMENT AWARE BACKUP AND RESTORATION

BACKGROUND

Computing devices may include any number of internal components such as processors, memory, and persistent storage. Each of the internal components of a computing device may be used to generate data. The process of generating, storing, and backing up data may utilize computing resources of the computing device such as processing and storage. The utilization of the aforementioned computing resources to generate backups may impact the overall performance of the computing devices.

SUMMARY

In one aspect, a remote agent for performing a backup of a virtual machine in accordance with one or more embodiments of the invention includes a persistent storage and a backup manager. The persistent storage stores backup policies. The backup manager obtains a backup generation request for the virtual machine and, in response to the backup generation request, performs a component validation analysis of a production host that hosts the virtual machine to identify a backup state of the production host; makes a first determination, based on the backup state of the production host, that the production host is in a backup-enabled state; and, in response to the first determination, generates a backup of the virtual machine, using the backup policies, for storage in a backup storage; and validates that the backup of the virtual machine is stored in the backup storage based on a reduced size representation of the backup and a reduced size representation of a copy of the backup in the backup storage.

In one aspect, a method for performing a backup of a virtual machine in accordance with one or more embodiments of the invention includes obtaining a backup generation request for the virtual machine and, in response to the backup generation request, performing a component validation analysis of a production host that hosts the virtual machine to identify a backup state of the production host; making a first determination, based on the backup state of the production host, that the production host is in a backup-enabled state; and, in response to the first determination, generating a backup of the virtual machine, using the backup policies, for storage in a backup storage; and validating that the backup of the virtual machine is stored in the backup storage based on a reduced size representation of the backup and a reduced size representation of a copy of the backup in the backup storage.

In one aspect, a non-transitory computer readable medium in accordance with one or more embodiments of the invention includes computer readable program code, which when executed by a computer processor enables the computer processor to perform a method for performing a backup of a virtual machine. The method includes obtaining a backup generation request for the virtual machine and, in response to the backup generation request, performing a component validation analysis of a production host that hosts the virtual machine to identify a backup state of the production host; making a first determination, based on the backup state of the production host, that the production host is in a backup-enabled state; and, in response to the first determination, generating a backup of the virtual machine, using the backup policies, for storage in a backup storage; and validating that the backup of the virtual machine is stored in the backup storage based on a reduced size representation of the backup and a reduced size representation of a copy of the backup in the backup storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for generating backups of virtual machines and restoring the virtual machines to predetermined states. Embodiments of the invention may monitor components of a production host that hosts virtual machines to identify whether the components are capable of performing the backup and/or restoration of the virtual machines. Embodiments of the invention may remediate the production host to attempt to place the production host in a backup-enabled state when components are identified as being incapable of performing backups and/or restorations. Doing so may improve computing device technology in a distributed network by reducing the number of failed backup/restoration attempts that result in wasted computing resources.

In one or more embodiments of the invention, a system includes a number of production hosts that each host virtual machines. The system may further include a backup storage for storing backups of the virtual machines. The backups of the virtual machines may be used for restoration purposes. Restoring a virtual machine may return a virtual machine to a previous state, e.g., an operable state in the past or other type of known state.

Figure 1:
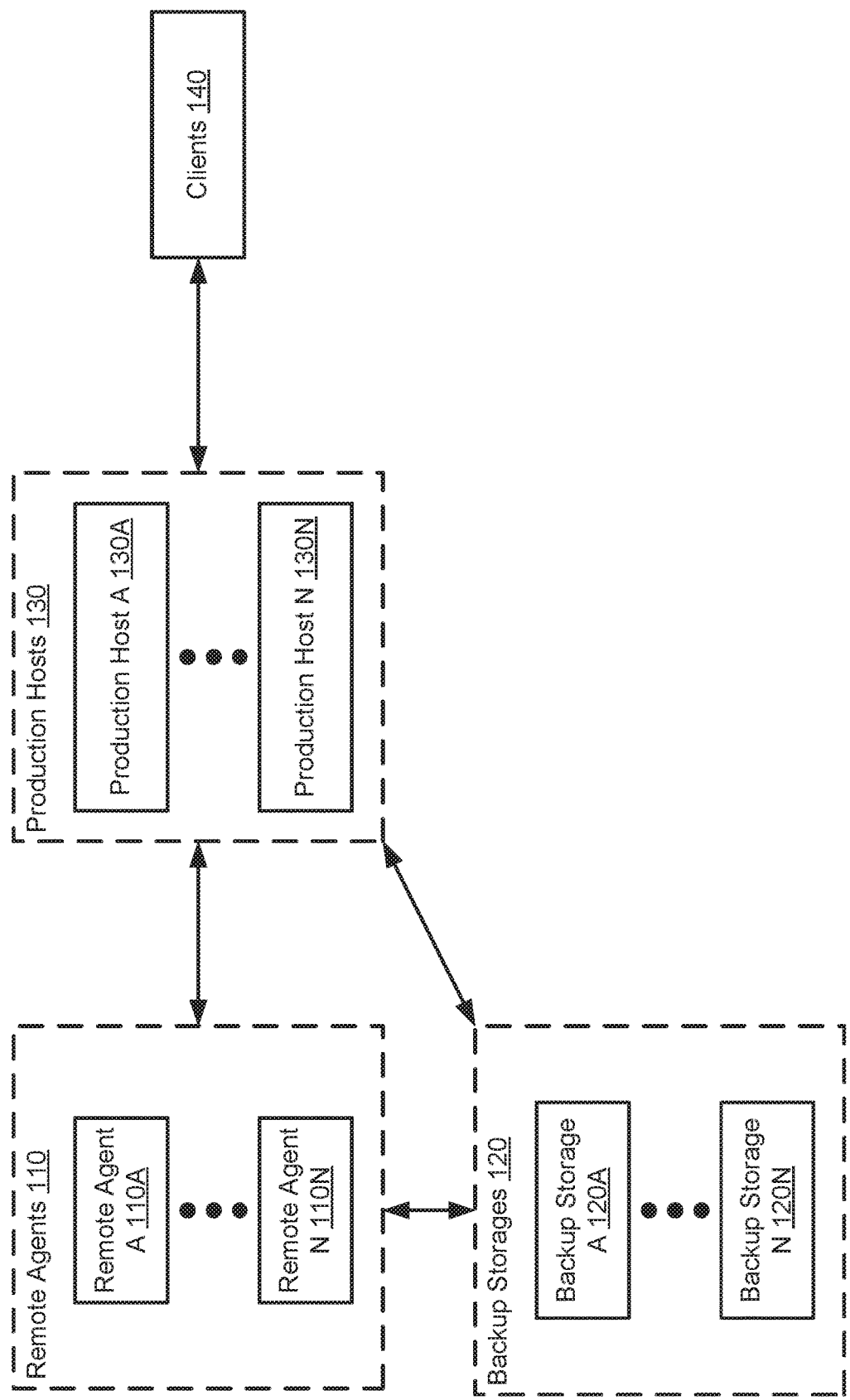
FIG. 1 shows a diagram of a system in accordance with one or more embodiments of the invention.

FIG. 1 shows a system in accordance with one or more embodiments of the invention. The system may include one or more remote agents (110A, 110N) that manage data stored in backup storages (120), one or more production hosts (130) that generate data stored in the backup storages (120), and clients (140) that interact with the production hosts (130). Each component of the system of FIG. 1 may be operably connected via any combination of wired and/or wireless connections. Each component of the system is discussed below.

In one or more embodiments of the invention, the remote agents (110) manage data stored in the backup storages (120) by storing data from the production hosts (130) in the backup storages (120) and by providing data that was previously stored in the backup storages (120) to the production hosts. The data may include, for example, a backup of data, or a portion thereof, stored in the production hosts (130A, 130N). The backup of the data may be used, for example, by the production hosts (130A, 130N) for restoration purposes. A restoration may change a state of the production hosts (130A, 130N) to a previous state. The restorations may be orchestrated by the remote agents (110).

In one or more embodiments of the invention, the remote agents (110) manage the production hosts (130) by prompting the production hosts (130) to provide data for storage in the backup storages (120). When prompting the production hosts (130) to generate data, the remote agents (110) may determine whether the production hosts (130) are in a state that enables the production hosts (130) to generate data. If the production hosts (130) are not in a state that enables them to produce the requested data, the remote agents (110) may: (i) attempt to remediate the functionality of the production hosts (130), (ii) modify the workflow of the remote agents (110) to account for the state of the production hosts (130), and/or (iii) take action to verify that the requested data is actually stored in the backup storages (120) as part of a workflow of the remote agents (110).

In one or more embodiments of the invention, the remote agents (110) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processors of the computing device cause the computing device to perform the functionality of the remote agents (110) described throughout this application and/or all, or a portion thereof, of the methods illustrated in FIGS. 3A-3E. For additional details regarding computing devices, see e.g., FIG. 5.

In one or more embodiments of the invention, the remote agents (110) are implemented as logical devices. A logical device may utilize the computing resources of any number of computing devices and thereby provide the functionality of the remote agents (110) described throughout this application and/or all, or a portion, of the methods illustrated in FIGS. 3A-3E. For additional details regarding the remote agents (110), see e.g., FIG. 2B.

In one or more embodiments of the invention, the backup storages (120) store data from the production hosts (130). The data may be, for example, backups of virtual machine data stored in the production hosts (130). A backup storage (e.g., 120A, 120N) may include functionality to verify that backups are stored in the backup storages (120). Verifying that the backups are stored in the backup storages (120) may include identifying whether the data of the backup is the same as the data from the production hosts (130) on which the backup is based. Due to multiple potential storage failure mechanisms, the backups may include different data from that which was intended to be stored in the backup storages (120) by the production hosts.

In one or more embodiments of the invention, the backup storages (120) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processors of the computing device cause the computing device to perform the functionality of the backup storages (120) described throughout this application. For additional details regarding computing devices, see e.g., FIG. 5.

In one or more embodiments of the invention, the backup storages (120) are implemented as logical devices. A logical device may utilize the computing resources of any number of computing devices and thereby provide the functionality of the backup storages (120) described throughout this application. For additional details regarding the backup storages (120), see e.g., FIG. 2D.

In one or more embodiments of the invention, the production hosts (130) generate data for storage in the backup storages (120) and utilize previously stored data in the backup storages (120) to restore a state of the production hosts (130) to a prior state. For example, the production hosts (130) may generate backups at a first point in time, store the backups in backup storage (120), retrieve the backups from the backup storage (120) at a second point in time, and restore the state of the production hosts (130) at a second point in time to the state of the production hosts at the first point in time using the retrieved backups.

In one or more embodiments of the invention, the production hosts (130) may generate a signature of a backup when attempting to store the backup in the backup storages (120). The signature of the backup may be used, for example, to verify that the backup stored in the backup storage (120) includes all of the data of the backup generated by the production hosts (130).

In one or more embodiments of the invention, the production hosts (130) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functionality of the production hosts (130) described throughout this application. For additional details regarding computing devices, see e.g., FIG. 5.

In one or more embodiments of the invention, the production hosts (130) are implemented as logical devices. A logical device may utilize the computing resources of any number of computing devices and thereby provide the functionality of the production host (130). For additional details regarding the production hosts (130), see e.g., FIG. 2A.

In one or more embodiments of the invention, the clients (140) utilize services hosted by the production hosts (130). The services may include storing and/or providing data to the clients (140), in addition to any number of other services.

In one or more embodiments of the invention, the clients (140) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the clients (140) described throughout this application. For additional details regarding computing devices, see e.g., FIG. 5.

In one or more embodiments of the invention, the clients (140) are implemented as logical devices. A logical device may utilize the computing resources of any number of computing devices and thereby provide the functionality of the clients (140) described throughout this application.

While the system of FIG. 1 has been illustrated as including a limited number of components for the sake of brevity, the system may include additional components (not shown), fewer components, and/or different components (not shown) without departing from the invention.

Figure 2A:
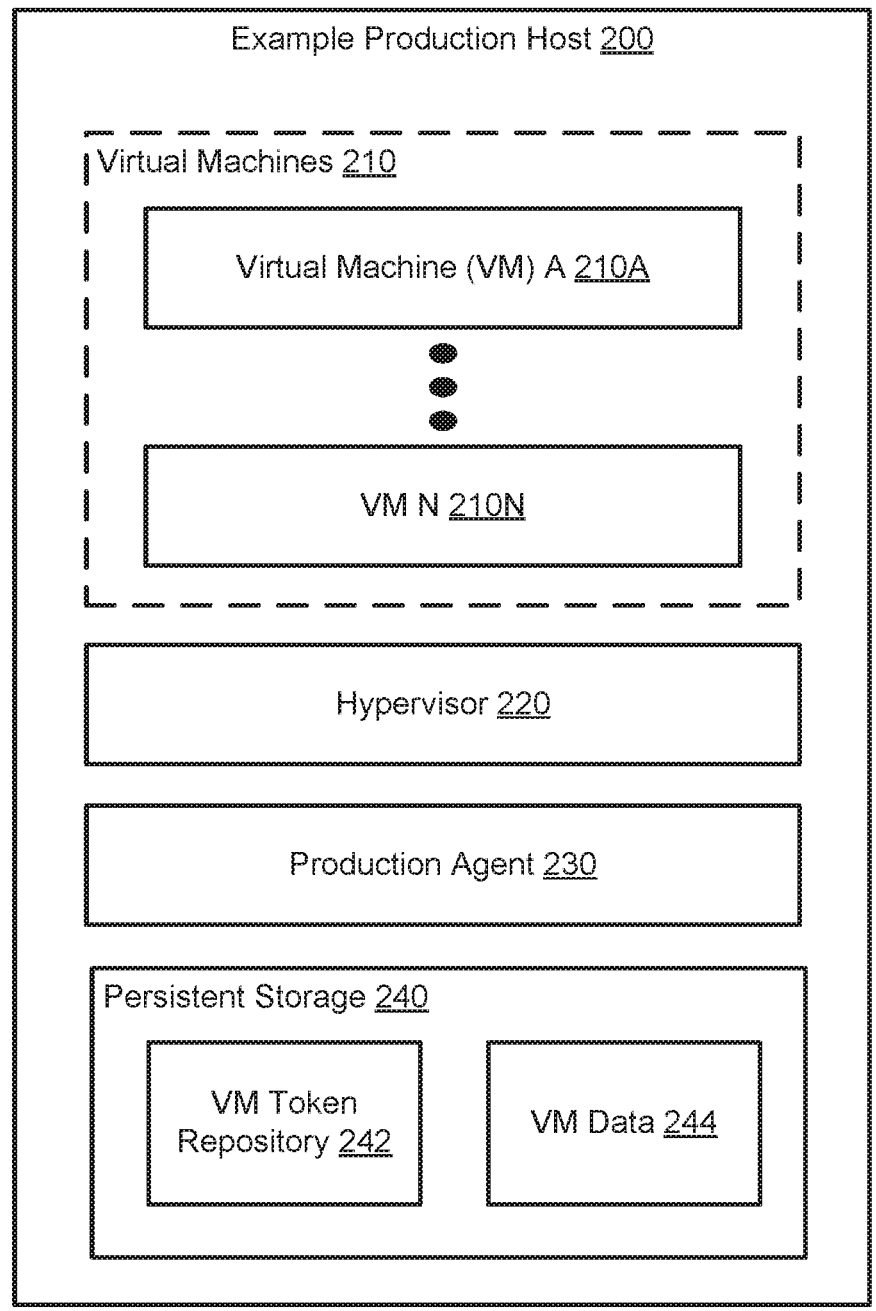
FIG. 2A shows a diagram of an example production host in accordance with one or more embodiments of the invention.

As discussed above, the backup storages (120) may store data obtained from the production hosts (130). FIG. 2A shows a diagram of an example production host (200) in accordance with one or more embodiments of the invention. The example production host may be similar to a production host (e.g., 130A, 130N) discussed above.

In one or more embodiments of the invention, the example production host (200) hosts virtual machines (210). The virtual machines (210) may logical entities, e.g., logical devices, executed using computing resources of the example production host (200) and/or other computing devices. Each of the virtual machines (210A, 210N) may be performing similar or different processes.

In one or more embodiments of the invention, the virtual machines (210) provide services to clients (e.g., 140, FIG. 1). For example, the virtual machines (210) may host instances of databases, email servers, and/or other applications. The virtual machines (210) may host other types of applications without departing from the invention. The clients (140, FIG. 1) may interact with any of the applications hosted by the virtual machines. In other words, receive services from the hosted applications.

Receiving services from the hosted applications may cause a portion of the application data to include data that is relevant to the clients. For example, clients may store data in a database hosted by a virtual machine. Other types of virtual machines may be relevant to the clients without departing from the invention.

In one or more of embodiments of the invention, the virtual machines (210A, 210N) are implemented as computer instructions, e.g., computer code, stored on a persistent storage that when executed by a processor of the example production host (200) cause the example production host (200) to provide the functionality of the virtual machines (210) described throughout this application and/or all or a portion of the methods illustrated in FIGS. 3A-3E. For additional details regarding virtual machines, see e.g., FIG. 2C.

In one or more embodiments of the invention, the example production host (200) includes a hypervisor (220) that orchestrates the operation of the virtual machines (210), a production agent (230) that manages the storage of virtual machine data (244) and restoration of virtual machine data (244), and a persistent storage (240). Each portion of the example production host (200) is discussed below.

In one or more embodiments of the invention, the hypervisor (220) orchestrates the operation of the virtual machines (210). The hypervisor (220) may orchestrate the operation of the virtual machines (210) by allocating computing resources to each virtual machine (e.g., 210A, 210N). In one or more embodiments of the invention, the hypervisor (220) orchestrates the operation of the virtual machines (210) by storing backups of the virtual machines (210) in a backup storage and/or restoring of the virtual machines (210) to a prior state using backups stored in the backup storage.

In one or more embodiments of the invention, the hypervisor (220) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (220) described throughout this application and/or all or a portion of the methods illustrated in FIGS. 3A-3E.

In one or more of embodiments of the invention, the hypervisor (220) is implemented as computer instructions, e.g., computer code, stored on a persistent storage that when executed by a processor of the example production host (200) cause the example production host (200) to provide the functionality of the hypervisor (220) described throughout the application and/or all or a portion of the methods illustrated in FIGS. 3A-3E.

In one or more embodiments of the invention, the production agent (230) manages backup generation for the virtual machines (210) and restoration of the virtual machines (210). The production agent (230) may issue commands to the hypervisor (220) to control the operation of a virtual machine (210) when a backup of the virtual machines (210) and/or a restoration of the virtual machines (210) to a previous state is requested.

In one or more embodiments of the invention, the production agent (230) generates a copy of virtual machine data (244) when generating a backup of one or more of the virtual machines (210). The virtual machine data (244) may reflect a virtual machine state at a predetermined point in time. Additionally, the production agent (230) may generate a signature of a backup generated based on the virtual machine data (244). As will be discussed in greater detail below, the signature may enable other entities to determine whether a copy of the backup stored in the other entities is the same as the backup generated by the production agent (230) upon which the signature is based. The signature may be stored in a virtual machine token repository (242).

In one or more embodiments of the invention, the production agent (230) is a hardened entity, i.e., not modifiable by an entity that is remote to the example production host (200) on which the production agent (230) is executing. The production agent (230) may have a set, finite number of predefined functions that may be invoked by a remote entity. In one or more embodiments of the invention, the production agent (230) is not configurable by modifying settings or associated configuration files by a remote entity.

In one or more embodiments of the invention, the production agent (230) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (230) described throughout this application and/or all or a portion of the methods illustrated in FIGS. 3A-3E.

In one or more embodiments of the invention, the production agent (230) is implemented as computer instructions, e.g., computer code, stored on a persistent storage that when executed by a processor of the example production host (200) causes the example production host (200) to provide the functionality of the production agent (230) described throughout this application and/or all or a portion of the methods illustrated in FIGS. 3A-3E.

The persistent storage (240) of the example production host (200) may include the virtual machine token repository (242) and the virtual machine data (244). The persistent storage (240) may include additional, fewer, and/or different data structures without departing from the invention. Each of the aforementioned data structures is discussed below.

The virtual machine token repository (242) may be a data structure that stores signatures of backups. The signatures may be, for example, fixed-size data (e.g., a virtual machine token) that is sent to a backup storage. A virtual machine token may be a hash of the backup. The hash may be generated by, for example, using a hash function such as SHA-1, SHA-2, or other functions.

The virtual machine data (244) may be copy of the data of one or more virtual machines (210). The virtual machine data (244) may be, for example, copies of virtual disks of virtual machines (210).

Figure 2B:
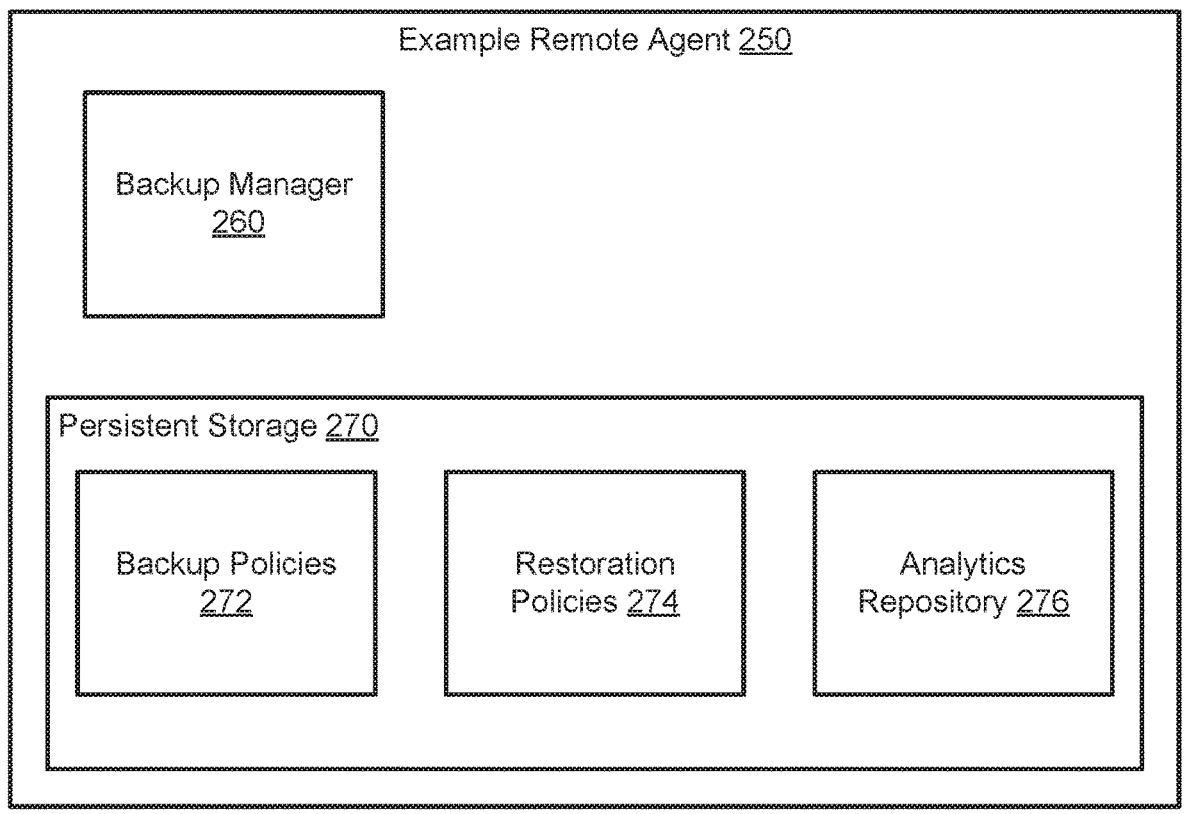
FIG. 2B shows a diagram of an example remote agent in accordance with one or more embodiments of the invention.

As discussed above, remote agents may orchestrate the process of generating backups and performing restorations. FIG. 2B shows a diagram of an example remote agent (250) in accordance with one or more embodiments of the invention. The example remote agent (250) may be similar to the remote agents (, FIG. 1) discussed above. As discussed above, the example remote agent (250) may orchestrate the storage of backups of production hosts in backup storage and restoration of production hosts using backups stored in backup storage. To provide the aforementioned functionality, the example remote agent (250) may include a backup manager (260) and persistent storage (270). The persistent storage (270) may store data structures utilized by the backup manager (260). Each component of the example remote agent (250) is discussed below.

In one or more embodiments of the invention, the backup manager (260) manages the backup generation and/or restoration of virtual machines hosted in production hosts. The backup manager (260) may manage generation of backups and/or restorations of virtual machines by attempting to ensure that a production host that will generate the backup and/or perform the restoration is in a predetermined state. In other words, in a state that is compatible with backup generation and/or restoration.

In one or more embodiments of the invention, the backup manager (260) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup manager (260) described throughout this application and/or all or a portion of the methods illustrated in FIGS. 3A-3E.

In one or more embodiments of the invention, the backup manager (260) is implemented as computer instructions (e.g. computer code) stored on a persistent storage that when executed by a processor of the example remote agent (250) causes the example remote agent (250) to provide the functionality of the backup manager (260) described throughout this application and/or all or a portion of the methods illustrated in FIGS. 3A-3E.

As discussed above, the backup manager (260) may use data structures stored in the persistent storage (270) to provide its functionality. In one or more embodiments of the invention, the persistent storage (270) includes physical data storage devices such as, for example, hard disk drives, solid state drives, tape drives, or any combination thereof. The persistent storage (270) may include or be other types of data storage devices without departing from the invention. The persistent storage (270) may be a virtualized storage without departing from the invention.

The persistent storage (270) may store backup policies (272), restoration policies (274), and an analytics repository (276). The persistent storage (270) may include additional, fewer, and/or different data structures without departing from the invention. Each of the aforementioned data structures is discussed below.

The backup policies (272) may specify how and when backups of virtual machines are generated and stored in backup storage. The backup policies (272) may specify, for example, a frequency in which backups are generated, a target entity (i.e., a virtual machine) for which the backup is generated, and a storage location. The backup policies (272) may specify different, fewer, or additional parameters for backup generation without departing from the invention.

The restoration policies (274) may specify when and how backups may be restored to previous states. The restoration policies may specify, for example, a target entity (i.e., a virtual machine) for which to restore, a point in time in which the target entity is restored, and a restoration location (i.e., a production host) in which the virtual machine restoration is performed. The restoration policies (274) may specify different, fewer, or additional parameters for performing restorations without departing from the invention.

The analytics repository (276) may be a data structure that stores information regarding previously performed backups and/or restorations. The information may include, for example, an amount of computing resources used by a computing device performing a backup and/or restoration, a status of a component (i.e., a production agent) that performed the backup and/or restoration, and/or a network bandwidth used to perform the backup and/or restoration.

Figure 2C:
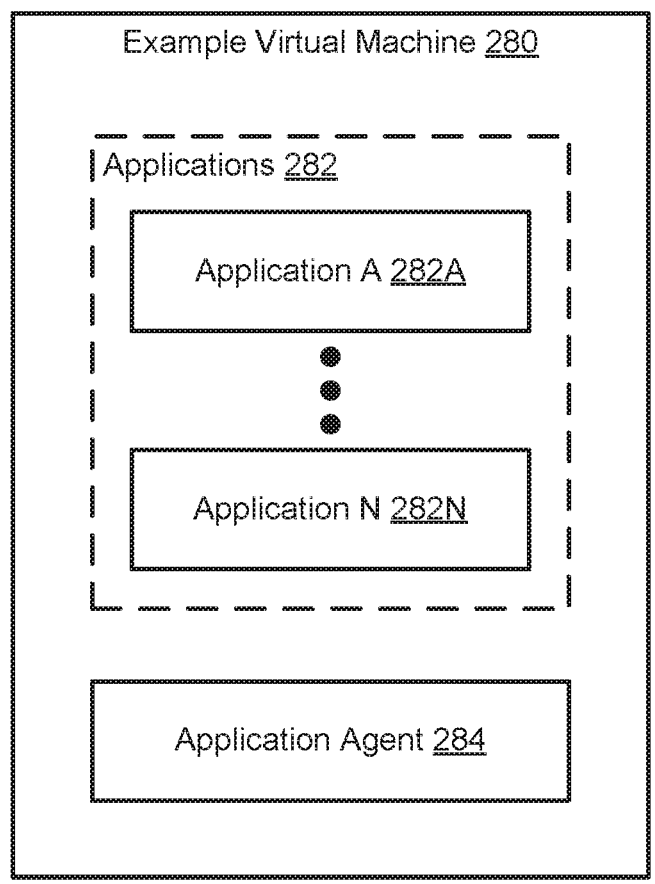
FIG. 2C shows a diagram of an example virtual machine in accordance with one or more embodiments of the invention.

As discussed above, remote agents may orchestrate the generation of backups and restoration of virtual machines. FIG. 2C shows a diagram of an example virtual machine in accordance with one or more embodiments of the invention. The example virtual machine (280) may be similar to a virtual machine (210A, 210N) discussed above. The example virtual machine (280) hosts applications (282). The example virtual machine (280) may include an application agent (284) that manages generation of application data for backup generation purposes. In some scenarios, an application agent (284) may become inoperable. In other words, may be in a state where the application agent (284) is unable to provide application data for backup generation purposes. In such a scenario, it may not be possible to generate a backup of the example virtual machine (280) until the application agent (284) is returned to an operational state. For example, a process of the application agent (284) may be need to be restarted to return the application agent (284) to a state in which it is capable of providing the required application data for backup generation purposes. In other scenarios, it may not be possible to return the application agent (284) to a state in which it is capable of providing the required application data for backup purposes. For example, corruption of the code on which executing processes of the application agent (284) may prevent the application agent (284) from being placed in an operational state without a higher level intervention by a system administrator, or other entity.

Figure 2D:
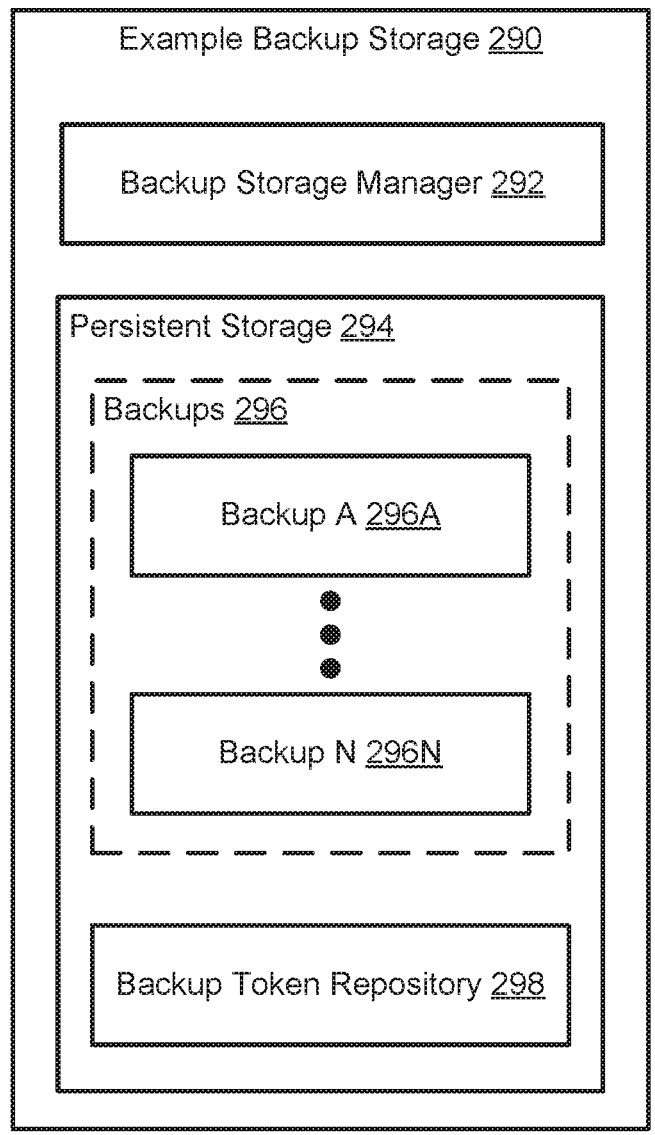
FIG. 2D shows a diagram of an example backup storage in accordance with one or more embodiments of the invention.

As discussed above, a production host may send backups of a virtual machine to a backup storage. FIG. 2D shows a diagram of an example backup storage (290) in accordance with one or more embodiments of the invention. The example backup storage (290) may be similar to a backup storage (120, FIG. 1) discussed above. As discussed above, the example backup storage (290) may store backups of a production host and verify that the stored backups include the same data as those generated by the production host. To provide the aforementioned functionality, the example backup storage (290) may include a backup storage manager (292) and persistent storage (294). Each of the aforementioned components of the example backup storage (290) is discussed below.

In one or more embodiments of the invention, the backup storage manager (292) manages backups (296) stored in the persistent storage (294). The backup storage manager (292) may manage the backups (296) by storing the backups (296) in the persistent storage (294) and verifying that the stored backups (296) include the same data as the backups generated by the production hosts, e.g., a storage match.

To perform a storage match of the backups (296), the backup storage manager (292) may generate a signature of the backups (296). The signature may be, for example, a hash of the backup. The signature of the backup may be stored as a token in a backup token repository (298). The token in the backup token repository (298) may be compared to a similar token generated by the production host. If the tokens match, backup is determined to include the same data as the backup generated by the production host. If the tokens do not match, the backup is determined as not including the same data as the backup generated by the production host.

If a backup is determined as not including the same data as the backup generated by the production host, the backup storage manager (292) may request and store an additional copy of the backup. This process may be repeated until the backup is determined as including the same data as the backup generated by the production host.

Figure 3A:
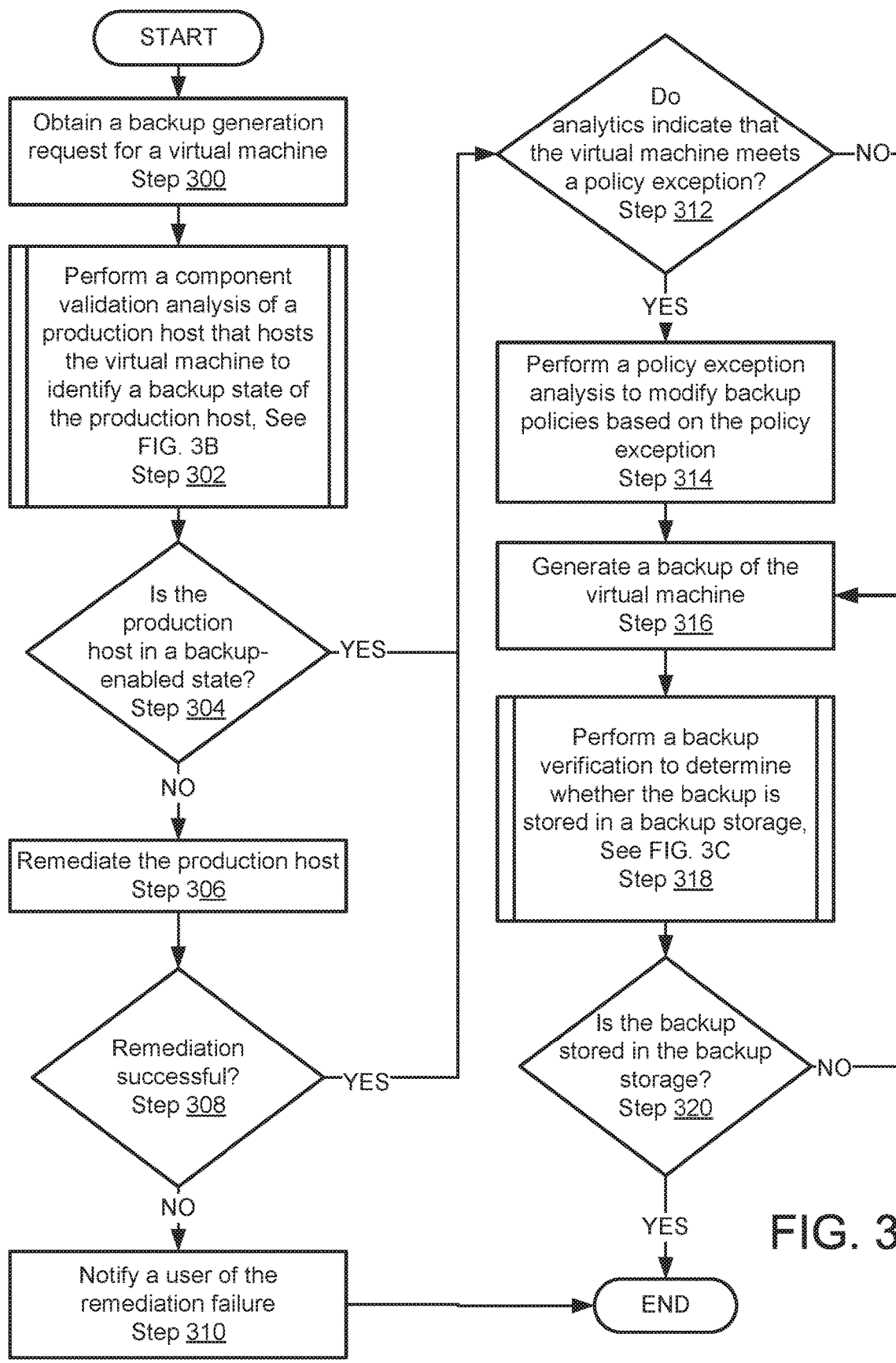
FIG. 3A shows a flowchart of a method of performing a backup of a virtual machine in accordance with one or more embodiments of the invention.

As discussed above, a remote agent may perform methods for managing virtual machines. FIG. 3A shows a flowchart of a method in accordance with one or more embodiments of the invention. The method depicted in FIG. 3A may be used to manage virtual machines in accordance with one or more embodiments of the invention. The method shown in FIG. 3A may be performed by, for example, a remote agent (e.g., 110A, 110N, FIG. 1). Other components of the system illustrated in FIG. 1 may perform all or a portion of the method of FIG. 3A without departing from the invention.

In Step 300, a backup generation request for a virtual machine is obtained.

In one or more embodiments of the invention, the backup generation request is obtained by a backup policy of the remote agent being triggered. In one or more embodiments of the invention, the backup generation request is obtained from a user via a client that requests a backup of the virtual machine be generated.

In Step 302, a component validation analysis of a production host that hosts the virtual machine is performed to identify a backup state of the production host.

In one or more embodiments of the invention, the component validation analysis is performed by monitoring components of the production hosts and determining whether the components are capable of completing the required tasks to generate the backup. A component that is not capable of performing the required task may be in, for example, a damaged state and may place the production host in a backup-disabled state. Components of the production host monitored may include, for example, a production agent, and application agent, persistent storage, and/or a hypervisor. The remote agent may obtain the backup state of the production hosts via network communications.

Figure 3B:
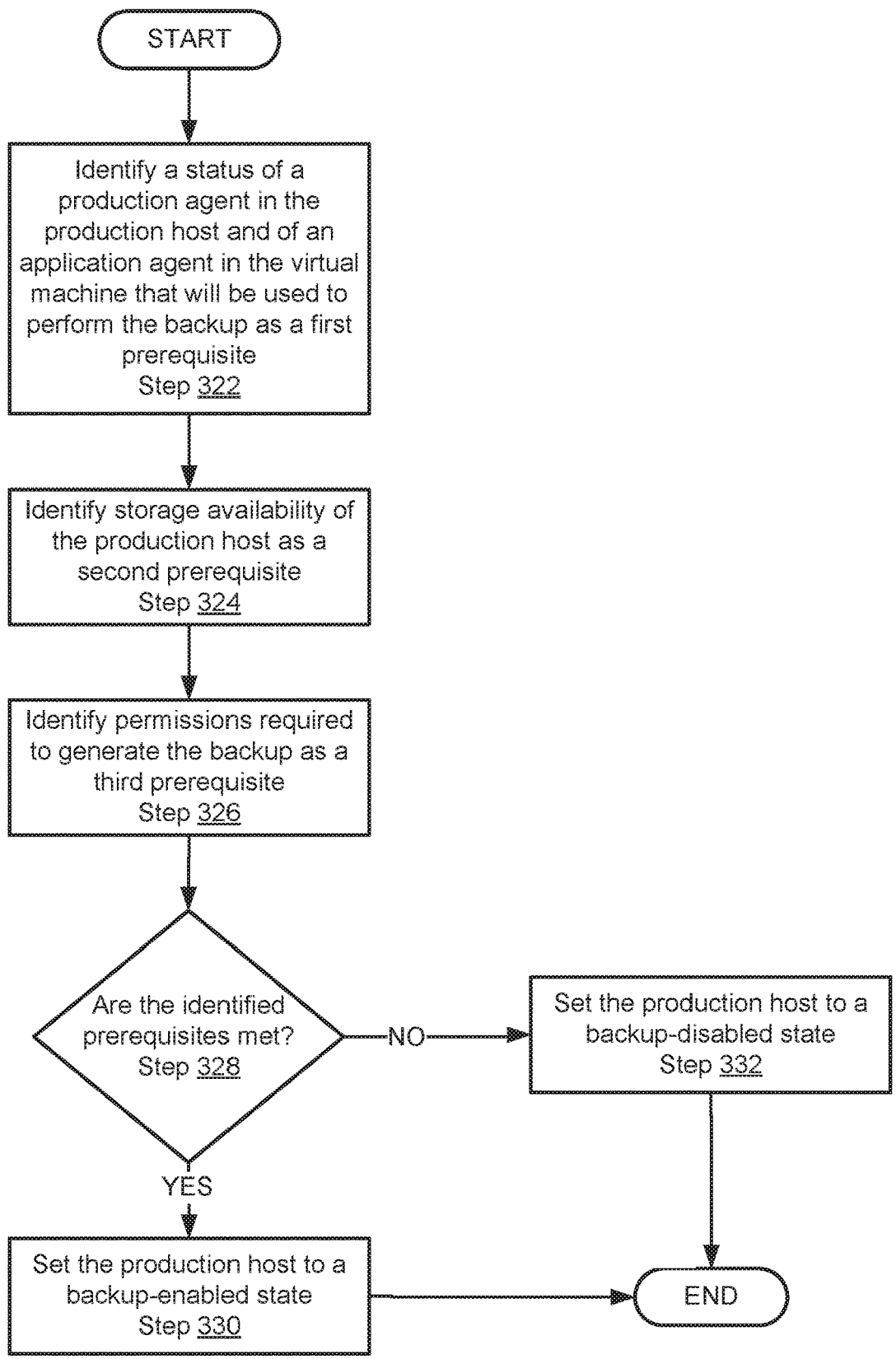
FIG. 3B shows a flowchart of a method of performing a component validation analysis in accordance with one or more embodiments of the invention.

In one or more embodiments of the invention, the component validation analysis is performed via the method illustrated in FIG. 3B. The component validation analysis may be performed via other methods without departing from the invention.

In Step 304, it is determined if the backup state of the production host is in a backup-enabled state. If the backup state of the production host is in a backup-enabled state, the method may proceed to Step 312. If the backup state of the production host is not in a backup-enabled state, the method may proceed to Step 306.

In one or more embodiments of the invention, a production host is determined to be in a backup-enabled state based on the component validation analysis. The remote agent may use the identified backup state to determine whether the production host is in a backup-enabled state.

In Step 306, the production host is remediated.

In one or more embodiments of the invention, the production host is remediated by attempting to change the state of the components of the production host that are not capable of performing their required tasks for backup generation to a state in which the components are capable of performing their required tasks for backup generation. For example, a production agent in a damaged state may be replaced by a production agent in a functional state, the production agent may be reinitialized to place the production agent in a functional state, etc.

The production host may be in a backup-disabled state due to insufficient storage. The production host may be remediated by increasing the amount of available storage in order to attempt to improve the likelihood that a backup may be successfully generated. In one or more embodiments of the invention, the production host is remediated by removing data from the persistent storage to allow the production host to have sufficient storage availability to generate a backup. In one or more embodiments of the invention, the production host reallocates storage to virtual machines hosted for which backups are being generated. For example, the virtualized storage resources of the production host may be reallocated to one or more virtual machines for which backups are being generated.

In one or more embodiments of the invention, remediation of the production host is not successful. In other words, the remediation may be attempted but does not complete successfully. For example, the production host may not be in a state that can be successfully remediated.

In Step 308, it is determined whether the remediation was successful. The remediation may be successful if the production host is in a backup enabled state. If the remediation was successful, the method may proceed to Step 312. If the remediation was not successful, the method may proceed to Step 310.

In Step 310, a user is notified of the remediation failure.

In one or more embodiments of the invention, the user is notified via the remote agent sending a notification to a client used by the user. Other methods of notifying the user may be used without departing from the invention.

In Step 312, it is determined whether analytics indicate that the virtual machine meets a policy exception. If the analytics indicate a policy exception, the method may proceed to Step 314. If the analytics indicate the virtual machine does not meet a policy exception, the method may proceed to Step 316.

In one or more embodiments of the invention, analytics are taken (or otherwise obtained) during the backup generation process. The analytics may record statistics about the backup generation process. The statistics may include usage data about usage of computing resources such as, for example, memory usage, a write rate of data in the virtual machine, and/or how much data was sent between computing devices through a network in response to the backup generation. The analytics may be used to determine whether the virtual machine meets a backup policy exception. For example, a threshold of a write rate of the virtual machine during the backup generation process may be used to make the determination. Additionally, a time since the last backup was generated, critical tags associated with the virtual machine, and/or a threshold of the usage data by the virtual machine may be used to determine if the virtual machine meets a policy exception. A threshold may be used for other usage data of the virtual machine to determine if the virtual machine meets a policy exception.

In Step 314, a policy exception analysis is performed to modify backup policies based on the policy exception.

In one or more embodiments of the invention, the policy exception analysis determines a type of policy exception implemented for the virtual machine. In other words, the policy exception analysis may determine how to modify the backup policies according to the policy exception analysis. The policy exception may include increasing a frequency in which a backup of the virtual machine is generated, decreasing the frequency, and/or modifying a location in which a backup of the virtual machine is stored. Other modifications to the backup policies may be performed in response to the policy exception analysis without departing from the invention.

In Step 316, a backup of the virtual machine is generated.

In one or more embodiments of the invention, the backup is generated by implementing backup policies associated with the backup generation request. The backup may be generated by, for example, the production host hosting the virtual machine. The backup may be generated by copying disks used by the virtual machine. If backup policies were modified in Step 314, the remote agent may use the modified backup policies to generate the backup.

In Step 318, a backup verification is performed to check whether the backup is stored in a backup storage.

In one or more embodiments of the invention, the backup verification is performed by comparing a token of a backup stored in backup storage with a second token that is both provided by a production host and associated with the backup stored in backup storage. If the tokens match, the backup is determined as being stored in backup storage. Otherwise, the backup is determined as not being stored in backup storage. Any number of circumstances may cause the copy of the backup stored in backup storage to be altered in an undesirable way. For example, a network connection issue between the production host and the backup storage may damage the copy of the backup before arriving in the backup storage. If a backup is determined as not being stored in the backup storage, the backup storage may notify the production agent to initiate the storage process for the backup again.

Figure 3C:
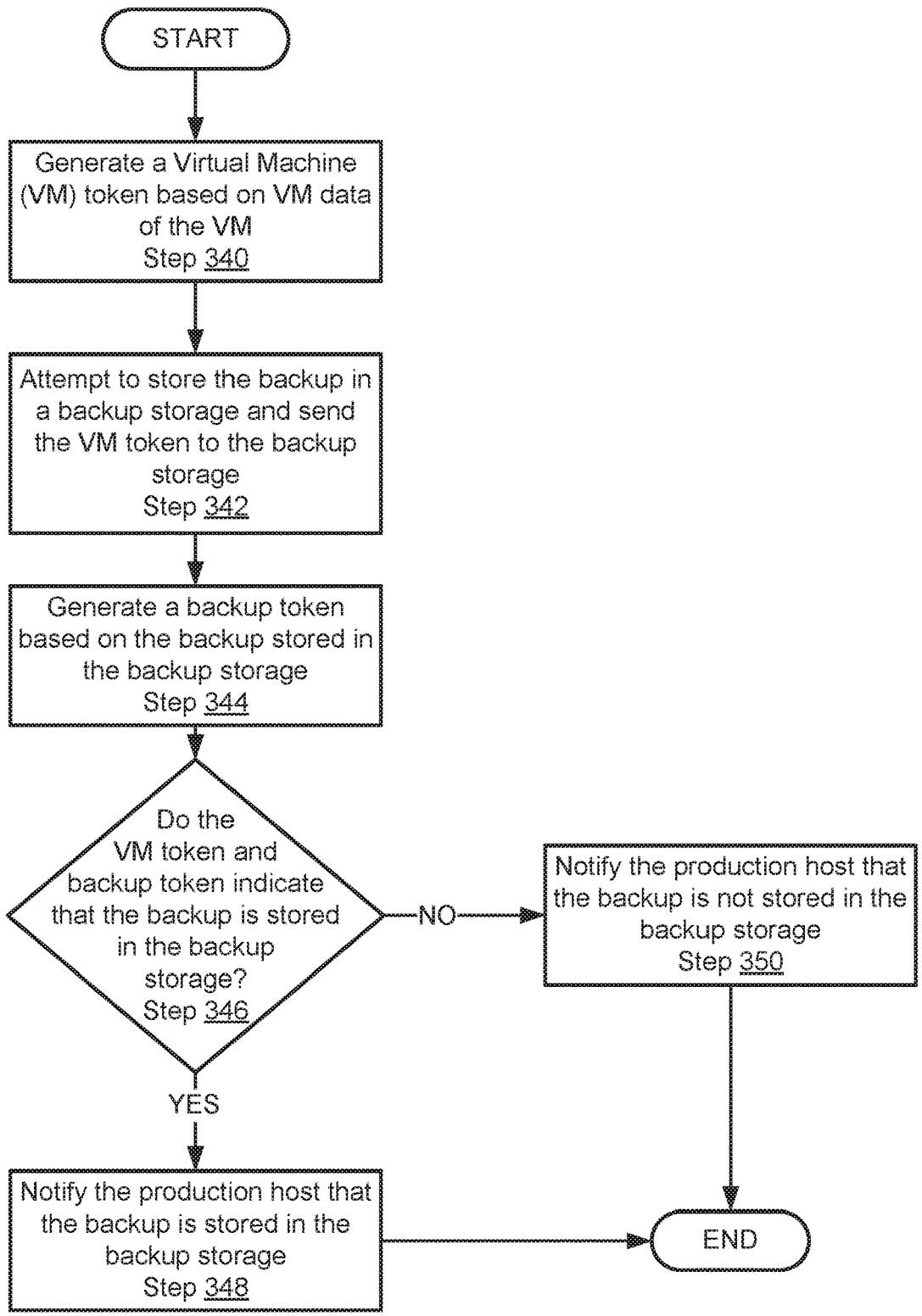
FIG. 3C shows a flowchart of a method of performing a backup verification in accordance with one or more embodiments of the invention.

In one or more embodiments of the invention, the backup verification is performed via the method illustrated in FIG. 3C. The backup verification may be performed via other methods without departing from the invention.

In Step 320, it is determined whether the backup was stored in the backup storage. If the backup is not stored in backup storage, the method may proceed to Step 316. If the backup is stored in the backup storage, the method may end following Step 320.

In one or more embodiments of the invention, the remote agent may determine that the backup is stored via a notification sent by the backup storage to the remote agent and/or the production host that states whether the backup is stored in the backup storage.

As discussed above, the remote agent may perform methods for performing a component validation analysis. FIG. 3B shows a flowchart of a method in accordance with one or more embodiments of the invention. The method depicted in FIG. 3B may be used to perform a component validation analysis in accordance with one or more embodiments of the invention. The method shown in FIG. 3B may be performed by, for example, a remote agent (e.g., 110A, 110N, FIG. 1).

Other components of the system illustrated in FIG. 1 may perform all or portion of the method of FIG. 3B without departing from the invention.

In Step 322, a status of a production agent in the production host and a status of an application agent in the virtual machine are identified as a first prerequisite.

In one or more embodiments of the invention, the production agent and the application agent are used to perform the backup of the virtual machine. The production agent and/or the application agent may be in an inoperable state. In other words, the production agent and/or the application agent may be incapable of performing predetermined tasks for generating the backup under the direction of a remote agent or other entity. The remote agent may determine that the first prerequisite is not met if the production agent and/or the application agent are in the inoperable state.

In Step 324, storage availability of the production host is identified as a second prerequisite.

In one or more embodiments of the invention, the storage availability of the production host is identified by measuring the total amount of storage capacity of the production host. The measured total amount of storage capacity may be compared to the total amount of storage used, e.g., the storage capacity allocated to a virtual machine for which a backup is being generated. The amount of unused storage capacity of the production host may be the storage availability.

In one or more embodiments of the invention, the second prerequisite is met when the storage availability exceeds a storage requirement for generating the backup. The storage requirement may be an estimate based on the quantity of storage used when prior backups were generated. The storage requirement may be compared to the storage capacity to identify a storage availability of the production host to generate the backup.

In Step 326, permissions required to generate the backup are identified as a third prerequisite.

In one or more embodiments of the invention, the permissions include access to resources such as, for example, a backup storage and/or a cluster-shared volume used by the virtual machine. A cluster shared volume may be a storage resource utilized by multiple virtual machines. A remote agent may determine whether the production host has access to the resources used to generate the backup in order to identify whether the third prerequisite is met.

In Step 328, it is determined whether all of the prerequisites are met, e.g., the first, second, and third prerequisite. If all of the prerequisites are met, the method may proceed to Step 330. If any of the prerequisites are not met, the method may proceed to Step 332.

In one or more embodiments of the invention, the remote agent considers all three prerequisites discussed when making the determination. Any one prerequisite not met may prompt the remote agent to determine that the prerequisites are not met. The remote agent may notify other entities if any of the prerequisites are not met as discussed in FIG. 3A.

In Step 330, the production host is set to a backup-enabled state.

The method may end following Step 330.

In Step 332, the production host is set to a backup-disabled state.

The method may end following Step 332.

FIG. 3C shows a flowchart of a method in accordance with one or more embodiments of the invention. The method depicted in FIG. 3C may be used to perform a backup verification in accordance with one or more embodiments of the invention. The method shown in FIG. 3C may be performed by, for example, a production host (e.g., 130A, 130N, FIG. 1) and/or backup storage (e.g., 120, FIG. 1). Other components of the system illustrated in FIG. 1 may perform the method of FIG. 3C without departing from the invention.

In Step 340, a virtual machine token is generated based on virtual machine data of the virtual machine.

In one or more embodiments of the invention, the virtual machine token is a hash of virtual machine data. The virtual machine token may be stored in a virtual machine token repository of the production host. The virtual machine token may be stored in other data structures or in other locations without departing from the invention. The virtual machine data may be, for example, a backup of the virtual machine.

In Step 342, an attempt to store the backup in backup storage is performed. The virtual machine token is also sent to the backup storage as part of the attempt.

In one or more embodiments of the invention, attempt is unsuccessful. In other words, all of the backup may not be stored in the backup storage. In Step 344, a backup token is generated based on the copy of backup stored in the backup storage.

In one or more embodiments of the invention, the backup token is a hash of the copy of the backup stored in the backup storage. The hash of the copy of the backup stored in the backup storage and the hash of the backup may be generated using the same hash function. The hash function may have the same seed when generating both hashes.

In Step 346, it is determined whether the virtual machine token and the backup token indicate that the backup is stored in the backup storage. If it is indicated that the backup is stored in backup storage, the method may proceed to Step 348. If it is not indicated that the backup is stored in the backup storage, the method may proceed to Step 350.

In one or more embodiments of the invention, the backup is determined to be stored in the backup when the virtual machine token and the backup token are identical, e.g., when the same hash function used to generated hashes of the backup and the copy of the backup are identical. A virtual machine token that is identical to the backup token may imply that the backup generated by the production host is very likely identical to the backup stored in the backup storage.

In Step 348, the production host is notified that the backup is stored in the backup storage.

In one or more embodiments of the invention, the production host is notified by receiving a notification from the backup storage that the backup is successfully stored in the backup storage.

The method may end following Step 348.

In Step 350, the production host is notified that the backup is not stored in the backup storage.

The method may end following Step 350.

Figure 3D:
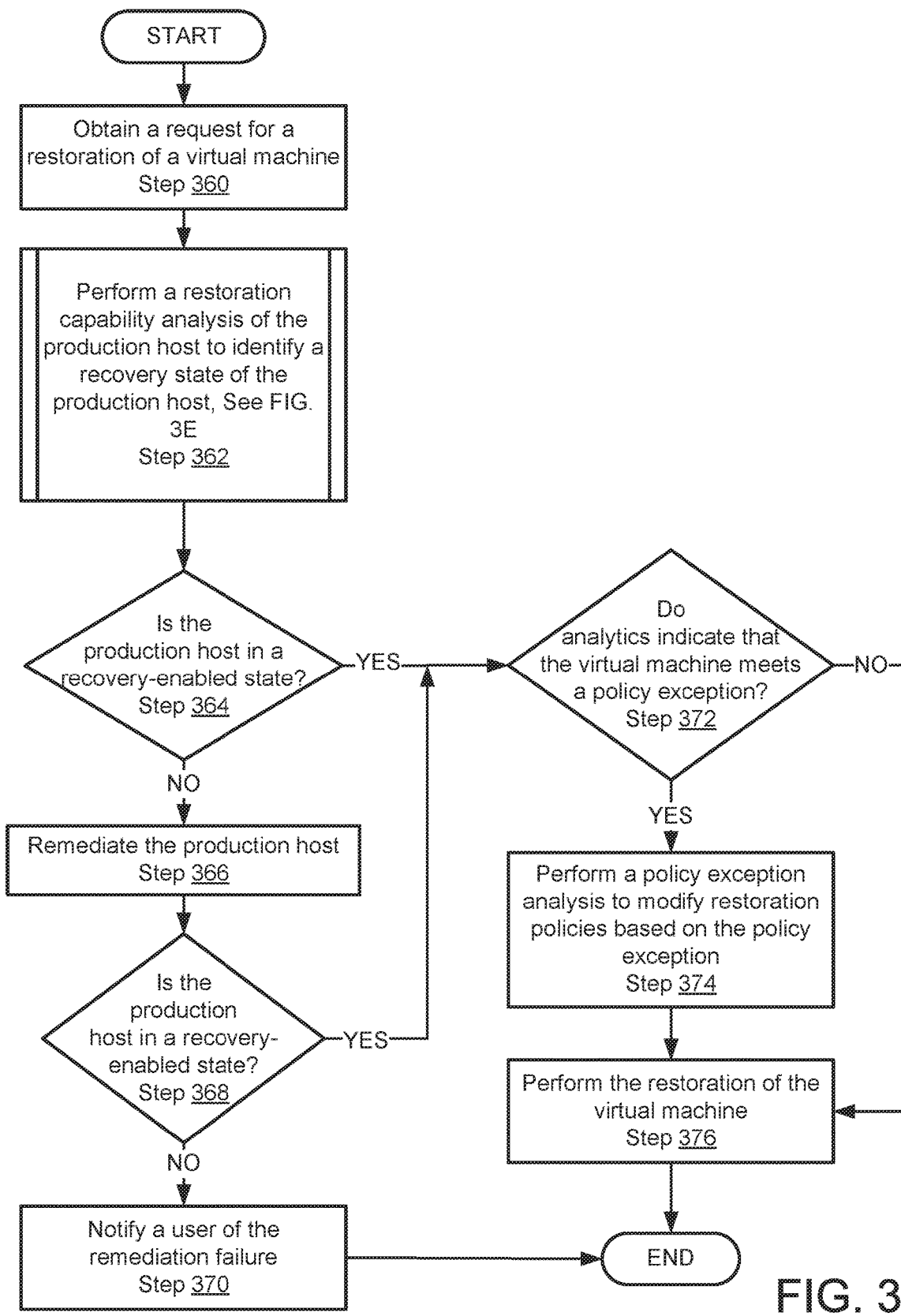
FIG. 3D shows a flowchart of a method of performing a restoration of a virtual machine in accordance with one or more embodiments of the invention.

FIG. 3D shows a flowchart of a method in accordance with one or more embodiments of the invention. The method depicted in FIG. 3D may be used to perform a remediation of a virtual machine in accordance with one or more embodiments of the invention. The method shown in FIG. 3D may be performed by, for example, a remote agent (e.g., 110A, 110N, FIG. 1). Other components of the system illustrated in FIG. 1 may perform the method of FIG. 3D without departing from the invention.

In Step 360, a request for a restoration of a virtual machine is obtained.

In one or more embodiments of the invention, the request for a restoration is obtained based on a triggered backup policy. In one or more embodiments of the invention, the request for a restoration is obtained from a user via a client that requests that a virtual machine be restored to a previous state.

In Step 362, a restoration capability analysis of the production host is performed to identify a recovery state of the production host.

In one or more embodiments of the invention, the restoration capability analysis is performed by monitoring components of the production host and determining, based on the monitoring, whether the components are capable of completing the required tasks to restore a virtual machine. A component that is not capable of performing the required task may be in an inoperable state and may place the production host in a recovery-disabled state. Components of the production host monitored may include, for example, a production agent, an application agent, a persistent storage, and/or a hypervisor.

In Step 364, it is determined whether the production host is in a recovery-enabled state. If the production host is in a recovery-enabled state, the method may proceed to Step 372. If the production host is not in a recovery enabled state, the method may proceed to Step 366.

In one or more embodiments of the invention, a production host is determined to be in a backup-enabled state based on the restoration capability analysis. The remote agent may use the identified recovery state to determine whether the production host is in a recovery-enabled state.

In Step 366, the production host is remediated.

In one or more embodiments of the invention, the production host is remediated by replacing, restarting, and/or restoring components of the production host that are not capable of performing their required tasks for the backup generation. For example, an application agent in an inoperable state may be replaced by an application agent in a functional state.

The production host may be in a recovery-disabled state due to insufficient storage. The production host may be remediated by increasing the amount of available storage allocated for performing restorations in order to attempt to place the production host in a state capable of storing data used for the restoration process. In one or more embodiments of the invention, the production host is remediated by removing data from the persistent storage to allow the production host to have sufficient storage availability to perform the restoration. The storage resources allocated for performing restorations may be changed via other methods without departing from the invention.

In one or more embodiments of the invention, a remediated production host may be placed in a recovery-enabled state. In one or more embodiments of the invention, a remediated production host may not be placed in a recovery-enabled state. In other words, the remediation attempt may fail.

In Step 368, it is determined whether the production host is in a recovery-enabled state. If the production host is in a recovery-enabled state, the method may proceed to Step 372. If the production host is not in a recovery enabled state, the method may proceed to Step 370.

In Step 370, a user is notified of the remediation failure.

Returning to Step 372, which may occur after Steps 364 or 368, it is determined whether analytics indicate that the virtual machine meets a policy exception. If a policy exception is met, the method may proceed to Step 374. If a policy exception is not met, the method may proceed to Step 376.

In one or more embodiments of the invention, analytics are taken during the restoration of the virtual machine. The analytics may record statistics about the restoration. The statistics may include usage data about usage of computing resources such as, for example, memory usage, memory availability during the restoration, storage availability during the restoration, how much data was sent between computing devices through a network in response to the restoration, and/or availability of network switches used by the computing devices exchanging data. The analytics may be used to determine whether the virtual machine meets an exception to a restoration policy. For example, a threshold of storage availability of the production host during the restoration may be used to make the determination. Additionally, a threshold may be used for other usage data of the virtual machine to determine if the virtual machine meets a policy exception.

In Step 374, a policy exception analysis is performed to modify restoration policies based on the policy exception.

In one or more embodiments of the invention, the policy exception analysis is used to determine a type of policy exception implemented for the virtual machine. In other words, the policy exception analysis may determine how to modify the restoration policies according to the policy exception analysis. The policy exception may include modifying a location in which a backup of the virtual machine is restored and/or modifying a schedule in which the virtual machine is to be restored. Other modifications to the restoration policies may be performed in response to the policy exception analysis without departing from the invention.

In Step 376, a restoration of the virtual machine is performed. The restoration may be performed in accordance with the original restoration policies or the restoration policies after modification in Step 374 depending on whether a policy exception is met.

The method may end following Step 376.

Figure 3E:
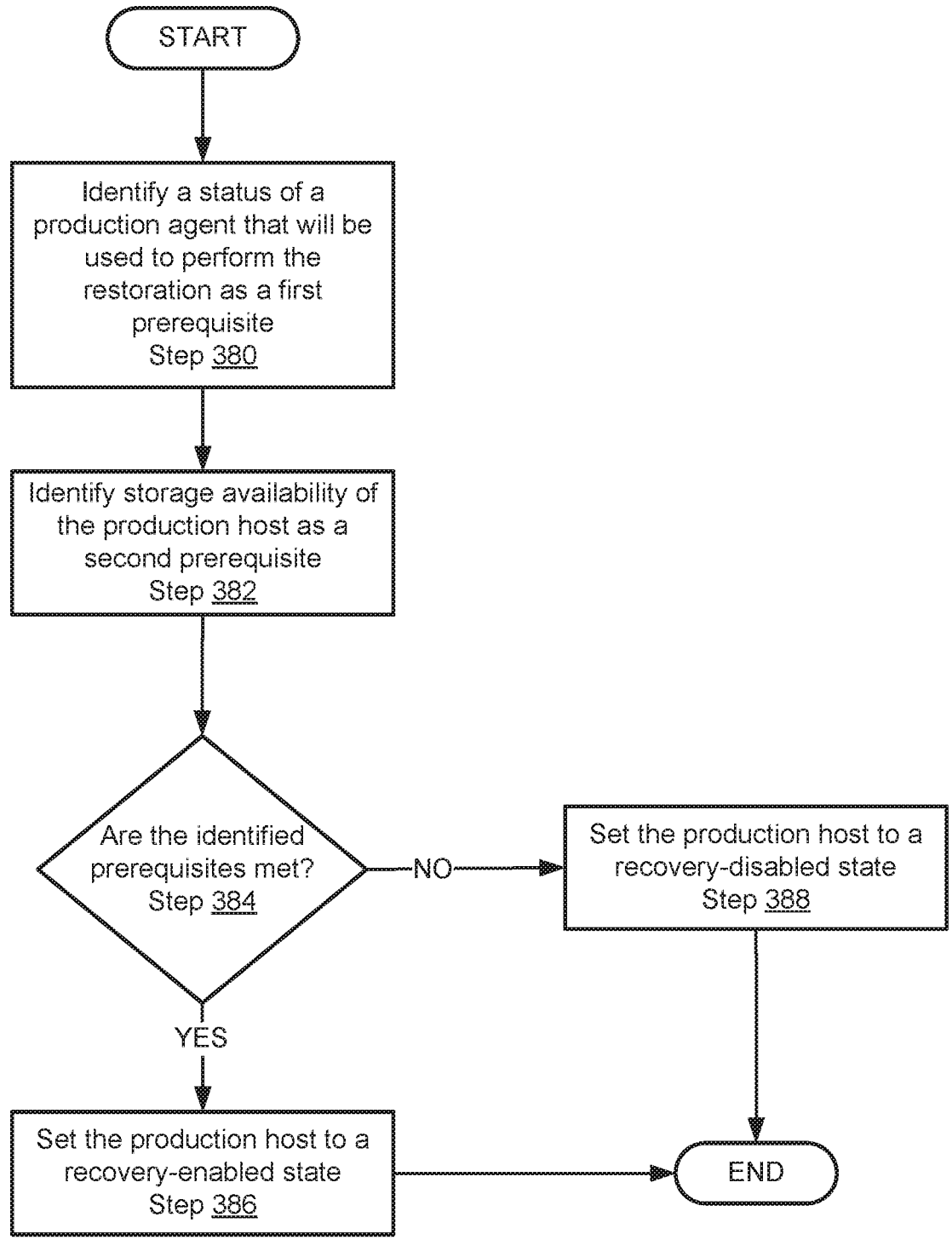
FIG. 3E shows a flowchart of a method of performing a restoration capability analysis in accordance with one or more embodiments of the invention.

FIG. 3E shows a flowchart of a method in accordance with one or more embodiments of the invention. The method depicted in FIG. 3E may be used to perform a restoration capability analysis of a production host in accordance with one or more embodiments of the invention. The method shown in FIG. 3E may be performed by, for example, a remote agent (e.g., 110A, 110N, FIG. 1). Other components of the system illustrated in FIG. 1 may perform the method of FIG. 3E without departing from the invention.

In Step 380, a status of a production agent that will be used to perform the restoration is identified as a first prerequisite. If the status of the production agent is an inoperable state, the first prerequisite is not met.

In Step 382, storage availability of the production host is identified as a second prerequisite. If the storage availability of the production host is insufficient to store the backup data from the backup storage used to perform the restoration, the second prerequisite is not met. The storage availability may be the quantity of the storage resources allocated for performing restorations.

In Step 384, it is identified whether all prerequisites are met, e.g., whether the production agent is in an operable state and whether sufficient storage resources are available for performing the restoration. If all of the prerequisites are met, the method may proceed to Step 386. If any of the prerequisites are not met, the method may proceed to Step 388. Additional prerequisites, other than those discussed in Steps 380 and 382, may be considered when making the determination in Step 384 without departing from the invention.

In Step 386, the production host is set to a recovery-enabled state.

The method may end following Step 386.

In Step 388, the production host is set to a recovery-disabled state.

The method may end following Step 388.

To further clarify aspects of the technology disclosed in this application, a non-limiting example is shown in FIGS. 4A-4E and described in the following paragraphs.

Example

Figure 4A:
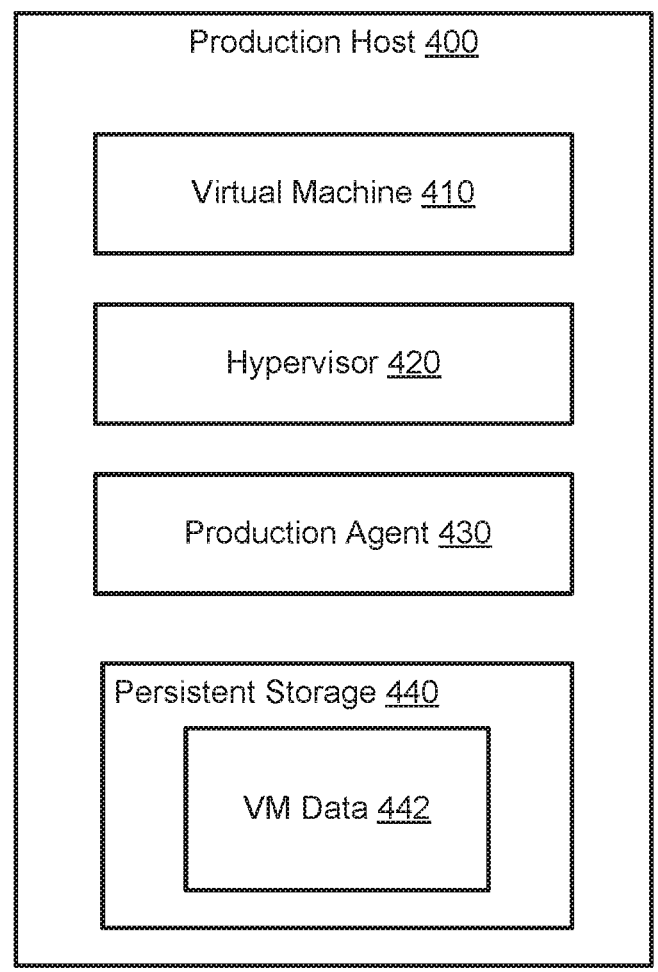
FIG. 4A shows a diagram of an example production host.

Consider a scenario in which an example production host (400) is orchestrated to generate a backup of a virtual machine as shown in FIG. 4A. The example production host (400) hosts a virtual machine (410), a hypervisor (420) that manages the virtual machine (410), and a production agent (430) that generates backups of the virtual machine (410). The backups may be based on a copy of the virtual machine data (442) which is stored in persistent storage (440).

Figure 4B:
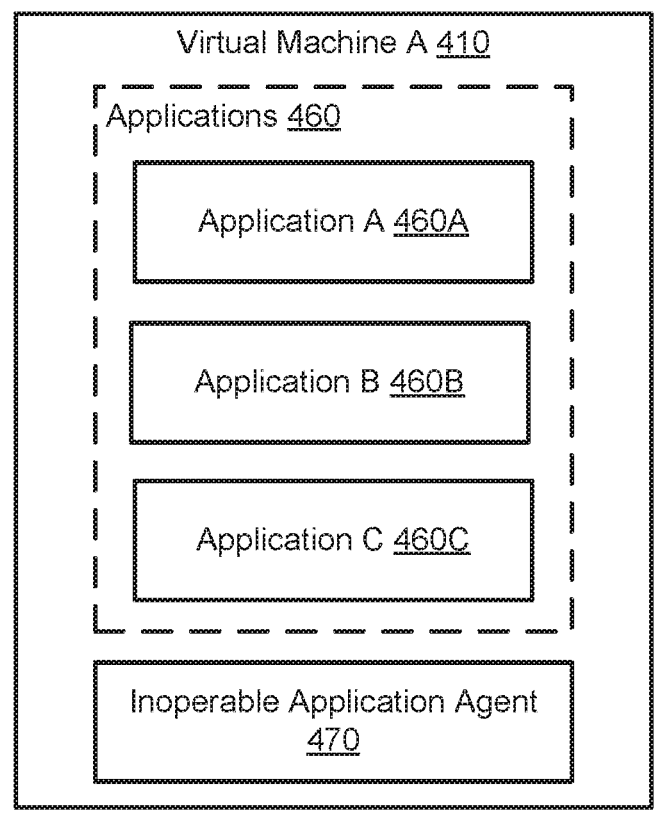
FIG. 4B shows a diagram of an example virtual machine at a first point in time.

The virtual machine (410) of FIG. 4A hosts applications (460), e.g., three applications (460A, 460B, 460C) as shown in FIG. 4B. The data produced by the applications (460A, 460B, 460C) may be scheduled for backup using an inoperable application agent (470). At a first point in time, the inoperable application agent (470) may not capable of performing its duties required for backup generation such as, for example, storing of a copy of the application data.

Returning to FIG. 4A, at a second point in time, a remote agent (not shown) may prompt the example production host (400) to generate a backup of the virtual machine (410). The example production host (400) may perform the methods of FIGS. 3A-3C to identify the inoperable application agent (470, FIG. 4B) and remediate the inoperable application agent (470) to place the production host in a backup-enabled state.

Figure 4C:
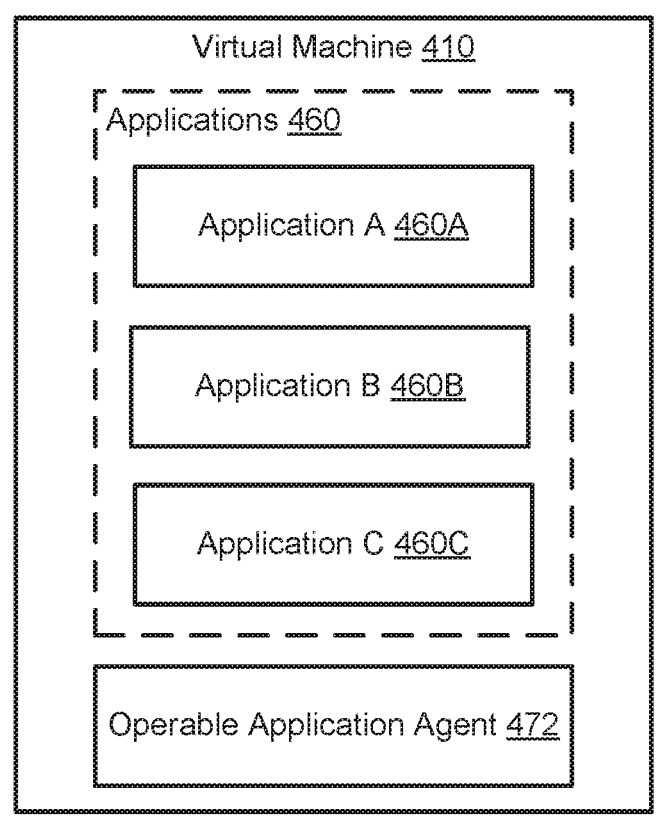
FIG. 4C shows a diagram of the example virtual machine of FIG. 4B after remediation of an application agent.

FIG. 4C shows a diagram of the virtual machine (410) after remediation. In FIG. 4C, an operable application agent (472) has replaced the inoperable application agent (470, FIG. 4B).

Figure 4D:
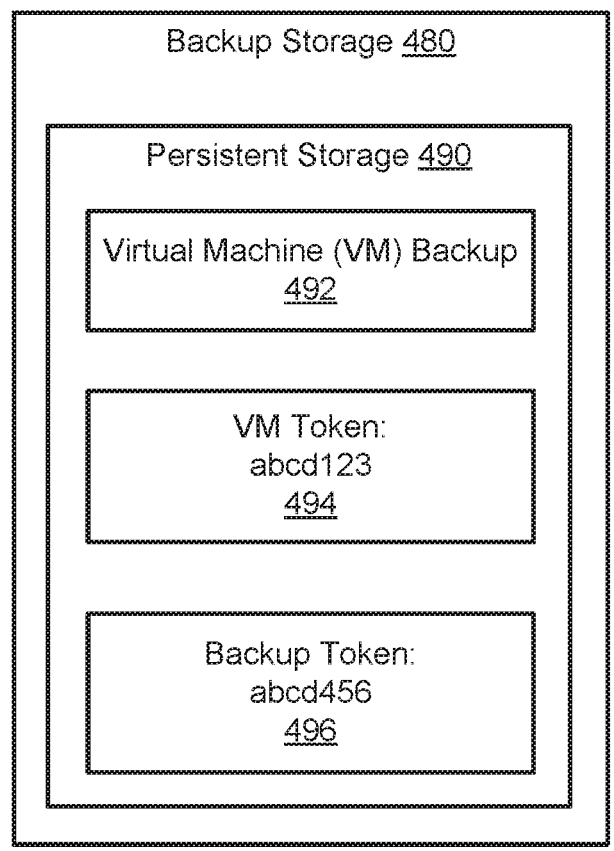
FIG. 4D shows a diagram of an example backup storage at a first point in time.
Figure 4E:
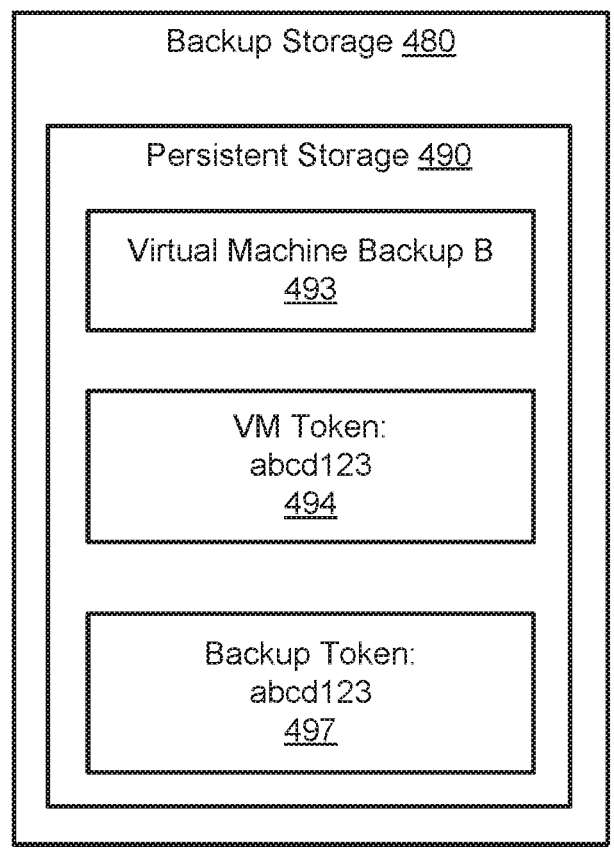
FIG. 4E shows a diagram of the example backup storage of FIG. 4D at a second point in time.

After the virtual machine is remediated, a backup of the virtual machine data (442, FIG. 4A) is generated and stored in a backup storage. FIG. 4D shows a diagram of the backup storage (480) storing the backup as virtual machine backup (492A). In addition to the virtual machine backup (492A), the persistent storage (490) also stores two tokens: a virtual machine backup token (494) and a backup token (496) that do not match. Because the tokens do not match, the backup storage identifies that the virtual machine backup (492) does not likely include the same data as the backup generated by the production host.

In response, the backup storage obtains a second copy of the backup from the production host and stores it as virtual machine backup B (493). The backup token (497) associated with virtual machine backup B (493) matches the virtual machine backup token (494) associated with the backup. Accordingly, the backup storage (480) determines that the virtual machine backup B (493) likely includes the same data as the backup generated by the production host and notifies, based on the determination, the production host that the storage was successful.

End of Example

Figure 5:
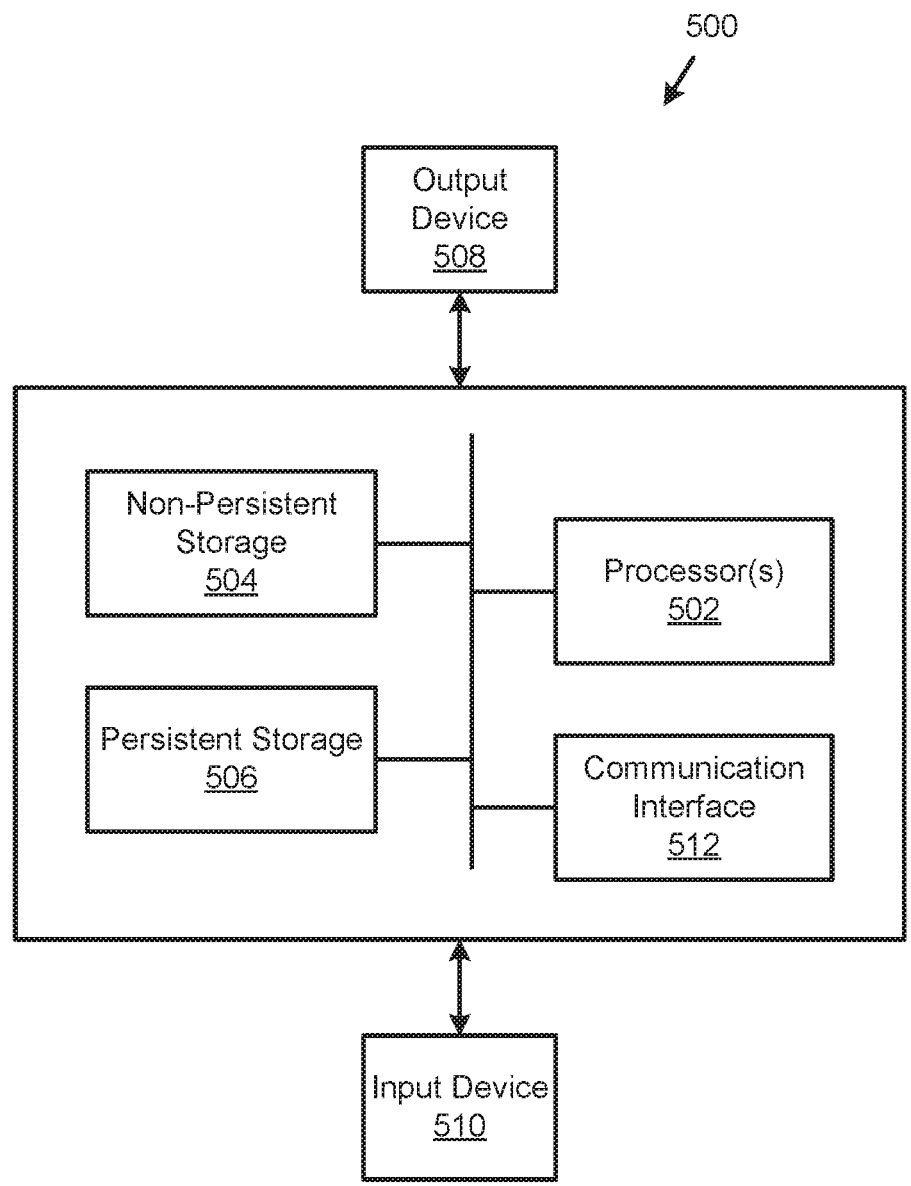
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of device computing device. Further, such instructions may correspond to computer readable instructions that are stored on one or more non-transitory computer readable mediums.

Embodiments of the invention may improve the operation of one or more computing devices. More specifically, embodiments of the invention may improve the reliability of generating backups and/or restoring virtual machines. The reliability may be improved by monitoring computing resources of the computing device and ensuring that the computing device has the sufficient computing resources to perform the backups and/or restorations.

Embodiments of the invention address the problem of unreliable computing devices in a distributed environment. Specifically, as computing resources are abstracted, e.g., virtualized, it becomes more likely that some entities will be executing using computing resources that are likely to fail. Embodiments of the invention may provide an improved method for ensuring the operation of executing entities that utilize computing resources in a distributed environment. The method may proactively monitor the state of the environment and take active steps to ensure that the distributed environment is in a state that is conducive to both backup generation and restoration using generated backups. In contrast to prior methods, the disclosed improved method has a higher likelihood of completing backup generations and restorations of entities in a distributed environment.

Thus, embodiments of the invention may address the problem of computing device failure in a distribute environment. This problem arises due to the technological nature of the environment in which virtualized entities operate because such environments abstract away the physical resources, which are subject to unpredictable failure, used by these entities thereby shrouding the likelihood of failure of virtualized entities. Embodiments of the invention address this, and other problems, by assuming that the underlying distributed computing environment of virtualized entities is subject to component and device level failure.

The problems discussed above should be understood as being examples of problems solved by embodiments of the invention disclosed herein and the invention should not be limited to solving the same/similar problems. The disclosed invention is broadly applicable to address a range of problems beyond those discussed herein.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote agent for performing a backup of a virtual machine, comprising:
   a persistent storage that stores backup policies; and
   a backup manager programmed to:
   obtain a backup generation request for the virtual machine; and
   in response to the backup generation request:
      perform a component validation analysis of a production host that hosts the virtual machine to identify a backup state of the production host, wherein the component validation analysis comprises:
         identifying a first responsiveness status of a production agent of the production host;
         identifying a second responsiveness status of the virtual machine; and
         identifying the backup state of the production host based on both of the first responsiveness status and the second responsiveness status;
      make a first determination, based on the backup state of the production host, that the production host is in a backup-enabled state; and
      in response to the first determination:
         generate a backup of the virtual machine, using the backup policies, for storage in a backup storage; and
         validate that the backup of the virtual machine is stored in the backup storage based on:
            a reduced size representation of the backup, and
            a reduced size representation of a copy of the backup in the backup storage.

2. The remote agent of claim 1, wherein the backup manager is further programmed to:
   obtain a second backup generation request of the virtual machine;
   in response to the second backup generation request:
      perform a second component validation analysis of the production host to identify a second backup state of the production host;
      make a second determination, based on the second backup state, that the production host is in a backup-disabled state; and
      in response to the second determination:
         perform a remediation of the production host based on the second backup state to attempt to change the second backup state of the production host to a backup-enabled state.

3. The remote agent of claim 2, wherein the backup manager is further programmed to:
   make a third determination, based on the remediation, that the production host is in the backup-disabled state; and
   in response to the third determination:
      reject the backup generation request.

4. The remote agent of claim 2, wherein the backup manager is further programmed to:
   make a third determination, based on the remediation, that the production host is in the backup-enabled state; and
   in response to the third determination:
      make a fourth determination that the virtual machine meets a policy exception based on, at least, an availability of computing resources of the production host; and
      in response to the fourth determination:
         perform a policy exception analysis to obtain modified backup policies; and
         generate a second backup of the virtual machine using the modified backup policies.

5. The remote agent of claim 1, wherein validating that the backup of the virtual machine is stored in the backup storage comprises:
   making a second determination that the reduced size representation of the backup does not match the reduced size representation of the copy of the backup in the backup storage; and
   in response to the second determination:
      making a third determination that the reduced size representation of the backup matches a reduced size representation of a second copy of the backup in the backup storage.

6. The remote agent of claim 1, wherein performing the component validation analysis of the production host that hosts the virtual machine to identify the backup state of the production host further comprises:
   identifying an available storage capacity of the production host;
   identifying a size of a shadow copy of the virtual machine; and
   identifying the backup state of the production host based on both of the available storage capacity and the size of the shadow copy.

7. A method for performing a backup of a virtual machine, comprising:
   obtaining a backup generation request for the virtual machine by a remote agent; and
   in response to the backup generation request:
      performing, by the remote agent, a component validation analysis of a production host that hosts the virtual machine to identify a backup state of the production host, wherein the component validation analysis comprises:
  identifying a first responsiveness status of a production agent of the production host;
  identifying a second responsiveness status of the virtual machine; and
  identifying the backup state of the production host based on both of the first responsiveness status and the second responsiveness status;
making a first determination, based on the backup state of the production host, that the production host is in a backup-enabled state; and
in response to the first determination:
  generating a backup of the virtual machine, using backup policies, for storage in a backup storage; and
  validating that the backup of the virtual machine is stored in the backup storage based on:
    a reduced size representation of the backup, and
    a reduced size representation of a copy of the backup in the backup storage.

8. The method of claim 7, wherein the method further comprises:
obtaining a second backup generation request of the virtual machine;
in response to obtaining the second backup generation request:
  performing a second component validation analysis of the production host to identify a second backup state of the production host;
  making a second determination, based on the second backup state, that the production host is in a backup-disabled state; and
  in response to the second determination:
    perform a remediation of the production host, by the remote agent, based on the second backup state to attempt to change the second backup state of the production host to a backup-enabled state.

9. The method of claim 8, wherein the method further comprises:
making a third determination, based on the remediation, that the production host is in the backup-disabled state; and
in response to the third determination:
  rejecting the backup generation request.

10. The method of claim 8, wherein the method further comprises:
making a third determination, based on the remediation, that the production host is in the backup-enabled state; and
in response to the third determination:
  making a fourth determination that the virtual machine meets a policy exception based on, at least, an availability of computing resources of the production host; and
  in response to the fourth determination:
    performing a policy exception analysis to obtain modified backup policies; and
    generating a second backup of the virtual machine using the modified backup policies.

11. The method of claim 7, wherein validating that the backup of the virtual machine is stored in the backup storage comprises:
making a second determination that the reduced size representation of the backup does not match the reduced size representation of the copy of the backup in the backup storage; and
in response to the second determination:
  making a third determination that the reduced size representation of the backup matches a reduced size representation of a second copy of the backup in the backup storage.

12. The method of claim 7, wherein performing the component validation analysis of the production host that hosts the virtual machine to identify the backup state of the production host further comprises:
identifying an available storage capacity of the production host;
identifying a size of a shadow copy of the virtual machine; and
identifying the backup state of the production host based on both of the available storage capacity and the size of the shadow copy.

13. A non-transitory computer readable medium comprising computer readable program code, which when executed by a computer processor enables the computer processor to perform a method for performing a backup of a virtual machine, the method comprising:
obtaining a backup generation request for the virtual machine by a remote agent; and
in response to the backup generation request:
  performing, by the remote agent, a component validation analysis of a production host that hosts the virtual machine to identify a backup state of the production host, wherein the component validation analysis comprises:
    identifying a first responsiveness status of a production agent of the production host;
    identifying a second responsiveness status of the virtual machine; and
    identifying the backup state of the production host based on both of the first responsiveness status and the second responsiveness status;
  making a first determination, based on the backup state of the production host, that the production host is in a backup-enabled state; and
  in response to the first determination:
    generating a backup of the virtual machine, using backup policies, for storage in a backup storage; and
    validating that the backup of the virtual machine is stored in the backup storage based on:
      a reduced size representation of the backup, and
      a reduced size representation of a copy of the backup in the backup storage.

14. The non-transitory computer readable medium of claim 13, wherein the method further comprises:
obtaining a second backup generation request of the virtual machine;
in response to obtaining the second backup generation request:
  performing a second component validation analysis of the production host to identify a second backup state of the production host;
  making a second determination, based on the second backup state, that the production host is in a backup-disabled state; and
  in response to the second determination:
    perform a remediation of the production host, by the remote agent, based on the second backup state to attempt to change the second backup state of the production host to a backup-enabled state.

15. The non-transitory computer readable medium of claim 14, wherein the method further comprises:

making a third determination, based on the remediation, that the production host is in the backup-disabled state; and in response to the third determination:
rejecting the backup generation request.

16. The non-transitory computer readable medium of claim 14, wherein the method further comprises:
making a third determination, based on the remediation, that the production host is in the backup-enabled state; and in response to the third determination:
making a fourth determination that the virtual machine meets a policy exception based on, at least, an availability of computing resources of the production host; and in response to the fourth determination:
performing a policy exception analysis to obtain modified backup policies; and
generating a second backup of the virtual machine using the modified backup policies.

17. The non-transitory computer readable medium of claim 13, wherein the method further comprises:
making a second determination that the reduced size representation of the backup does not match the reduced size representation of the copy of the backup in the backup storage; and in response to the second determination:
making a third determination that the reduced size representation of the backup matches a reduced size representation of a second copy of the backup in the backup storage.

\* \* \* \* \*